United States Patent
Seo et al.

(10) Patent No.: US 12,524,896 B2
(45) Date of Patent: Jan. 13, 2026

(54) METHOD AND APPARATUS FOR ESTIMATING DEPTH OF IMAGE

(71) Applicants: ELECTRONICS AND TELECOMMUNICATIONS RESEARCH INSTITUTE, Daejeon (KR); KOREA UNIVERSITY OF TECHNOLOGY AND EDUCATION INDUSTRY-UNIVERSITY COOPERATION FOUNDATION, Cheonan-si (KR)

(72) Inventors: Beom-Su Seo, Sejong-si (KR); Byung-Jae Park, Daejeon (KR)

(73) Assignees: Electronics and Telecommunications Research Institute, Daejeon (KR); Korea University of Technology and Education Industry—University Cooperation Foundation, Cheonan-si (KR)

( * ) Notice: Subject to any disclaimer, the term of this patent is extended or adjusted under 35 U.S.C. 154(b) by 376 days.

(21) Appl. No.: 18/189,338

(22) Filed: Mar. 24, 2023

(65) Prior Publication Data

US 2023/0401734 A1    Dec. 14, 2023

(30) Foreign Application Priority Data

Jun. 8, 2022   (KR) .................. 10-2022-0069401

(51) Int. Cl.
*G06T 7/593*   (2017.01)
*G06T 7/11*    (2017.01)

(52) U.S. Cl.
CPC ............... *G06T 7/593* (2017.01); *G06T 7/11* (2017.01); *G06T 2207/10012* (2013.01); *G06T 2207/20021* (2013.01)

(58) Field of Classification Search
CPC . G06T 7/593; G06T 7/11; G06T 2207/10012; G06T 2207/20021;
(Continued)

(56) References Cited

U.S. PATENT DOCUMENTS 8,774,512 B2 * 7/2014 Yao ..................... G06T 5/77
                                                    382/173
9,639,951 B2 * 5/2017 Salahat ............... G06T 7/248
(Continued)

FOREIGN PATENT DOCUMENTS

EP     2887311 A1 * 6/2015 .......... H04N 13/271
JP     2022519194 A   3/2022
(Continued)

*Primary Examiner* — Mia M Thomas
(74) *Attorney, Agent, or Firm* — Rabin & Berdo, P.C.

(57) ABSTRACT

Disclosed herein is a method for estimating a depth of an image. The method may include acquiring a first depth image based on left and right images collected from a stereo camera, estimating a second depth image based on any one of the left and right images, generating a depth estimation model based on first depth values within a depth range recognizable by the stereo camera in the first depth image and on second depth values of the second depth image matching the first depth values, and inputting third depth values of a range intended to be estimated in the second depth image to the depth estimation model, thereby estimating fourth depth values of the first depth image matching the third depth values.

14 Claims, 7 Drawing Sheets

(58) Field of Classification Search
CPC . G06T 2207/20084; G06T 7/55; G06T 7/136; G06T 2207/10028
See application file for complete search history.

(56) References Cited

U.S. PATENT DOCUMENTS

| | | |
|---|---|---|
| 12,093,824 B2 * | 9/2024 | Yang ..................... G06V 20/56 |
| 2013/0155050 A1 * | 6/2013 | Rastogi ................ H04N 25/671 |
| | | 345/419 |
| 2018/0197295 A1 | 7/2018 | Kim et al. |
| 2019/0035099 A1 * | 1/2019 | Ebrahimi Afrouzi .. G06N 3/008 |
| 2019/0206075 A1 * | 7/2019 | Ganguli ................. G06T 7/596 |
| 2019/0313082 A1 | 10/2019 | Kim et al. |
| 2020/0073531 A1 * | 3/2020 | Romano ................ G01B 11/25 |
| 2021/0158561 A1 * | 5/2021 | Park .......................... G06T 7/74 |
| 2021/0350560 A1 | 11/2021 | Laidlow et al. |
| 2021/0352262 A1 * | 11/2021 | Buslaev ................... G06T 7/80 |
| 2022/0253706 A1 * | 8/2022 | Yang ........................ G06N 3/08 |
| 2022/0343521 A1 * | 10/2022 | Wofk ....................... G06T 7/50 |
| 2022/0343660 A1 * | 10/2022 | Yang ........................ G06V 10/70 |
| 2023/0035477 A1 * | 2/2023 | Gu ............................. G06T 5/77 |
| 2023/0091924 A1 * | 3/2023 | Dowdall ................. G01S 17/42 |
| | | 701/26 |
| 2023/0229171 A1 * | 7/2023 | Kim ........................ G01S 17/87 |
| 2023/0410338 A1 * | 12/2023 | Liu ........................ G06V 20/46 |
| 2023/0419482 A1 * | 12/2023 | Yangdai ................ A61B 1/041 |
| 2024/0029274 A1 * | 1/2024 | Wang ........................ G06T 7/55 |

FOREIGN PATENT DOCUMENTS

| | | | |
|---|---|---|---|
| KR | 10-2011-0015142 A | 2/2011 | |
| KR | 10-2018-0096980 A | 8/2018 | |
| KR | 10-2229861 B1 | 3/2021 | |
| WO | WO-2022122124 A1 * | 6/2022 | ............. G06T 7/246 |

* cited by examiner

METHOD AND APPARATUS FOR ESTIMATING DEPTH OF IMAGE

CROSS REFERENCE TO RELATED APPLICATION

This application claims the benefit of Korean Patent Application No. 10-2022-0069401, filed Jun. 8, 2022, which is hereby incorporated by reference in its entirety into this application.

BACKGROUND OF THE INVENTION

1. Technical Field

The present disclosure relates to a method and apparatus for image depth estimation for estimating geographical information in a range that cannot be recognized by a stereo camera having a narrow baseline that is required for autonomous driving of a small robot.

2. Description of the Related Art

Generally, intelligent robots are used as desk robots, guide robots, rideable robots, and the like in personal service fields and are expanding their services in various fields for delivery, building surveillance, reconnaissance, and the like.

In the case of a mobile object capable of including large hardware and being stably supplied with power, such as an autonomous vehicle, various sensors capable of recognizing a surrounding environment from short to long distances according to the purpose of use may be installed therein.

Meanwhile, a small robot providing a service in a region with a large population is also required to recognize a surrounding environment for autonomous driving, like a vehicle, and a small LiDAR device or a stereo camera may be used therefor.

Here, a small LiDAR device may not be suitable from an economic aspect, such as robot production and management cost, or may be difficult to be installed. Therefore, a stereo camera capable of giving information about a distance of about 10 m is mainly used for a small robot.

A stereo camera is able to acquire further distance information as the baseline length thereof is longer. However, because the baseline length cannot be extended due to physical and mechanical limitations, it is impossible to acquire information about a region out of the specification range of the stereo camera.

SUMMARY OF THE INVENTION

An object of the present disclosure is to provide a method and apparatus for estimating a depth of an image through which the physical recognition range of a stereo camera is capable of being extended without increasing the baseline length of the stereo camera.

Another object of the present disclosure is to provide a method and apparatus for estimating a depth of an image in order to estimate information of a region outside of the specification range of a stereo camera having a narrow baseline.

In order to accomplish the above objects, a method for estimating a depth of an image according to the present disclosure may include acquiring a first depth image based on left and right images collected from a stereo camera, estimating a second depth image based on any one of the left and right images, generating a depth estimation model based on first depth values within a depth range recognized by the stereo camera in the first depth image and on second depth values of the second depth image matching the first depth values, and inputting third depth values of a region intended to be estimated in the second depth image to the depth estimation model, thereby estimating fourth depth values of the first depth image matching the third depth values.

The first depth image may be acquired by stereo matching of the left and right images.

The depth estimation model may be generated by pairing the first depth values with the second depth values matching the first depth values.

The method may further include generating an output image using the fourth depth values and the first depth values.

The third depth values of the region intended to be estimated in the second depth image may be depth values out of the depth range recognized by the stereo camera.

The third depth values of the region intended to be estimated in the second depth image may include all depth values of the second depth image.

The depth estimation model may be generated by dividing the depth range recognized by the stereo camera into sections and pairing means of the first depth values with means of the second depth values for the respective sections.

Fifth depth values of the first depth image, which are output when inputting the second depth values to the depth estimation model, may be compared with the first depth values of the first depth image matching the fifth depth values, and the depth estimation model may be regenerated when a comparison value is equal to or greater than a preset threshold.

The comparison value may be generated by calculating at least one of a cumulative mean acquired by accumulating differences between the fifth depth values and the first depth values, a cumulative Root Mean Squared Error (RMSE), a cumulative mean log error, a cumulative squared relative difference, or a cumulative RMSE log, or a combination thereof.

Also, an apparatus for estimating a depth of an image according to an embodiment includes memory in which a control program for estimating a depth of an image is stored and a processor for executing the control program stored in the memory, and the processor may acquire a first depth image based on left and right images collected from a stereo camera, estimate a second depth image based on any one of the left and right images, generate a depth estimation model based on first depth values within a depth range recognized by the stereo camera in the first depth image and on second depth values of the second depth image matching the first depth values, and input third depth values of a region intended to be estimated in the second depth image to the depth estimation model, thereby estimating fourth depth values of the first depth image matching the third depth values.

The first depth image may be acquired by stereo matching of the left and right images.

The processor may generate the depth estimation model by pairing the first depth values with the second depth values matching the first depth values.

The processor may generate an output image using the fourth depth values and the first depth values.

The third depth values of the region intended to be estimated in the second depth image may be depth values out of the depth range recognized by the stereo camera.

The third depth values of the region intended to be estimated in the second depth image may include all depth values of the second depth image.

The processor may divide the depth range recognized by the stereo camera into sections and pair means of the first depth values with means of the second depth values for the respective sections, thereby generating the depth estimation model.

The processor may compare fifth depth values of the first depth image, which are output when inputting the second depth values to the depth estimation model, with the first depth values of the first depth image matching the fifth depth values, and may regenerate the depth estimation model when a comparison value is equal to or greater than a preset threshold.

The processor may generate the comparison value by calculating at least one of a cumulative mean acquired by accumulating differences between the fifth depth values and the first depth values, a cumulative Root Mean Squared Error (RMSE), a cumulative mean log error, a cumulative squared relative difference, or a cumulative RMSE log, or a combination thereof.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
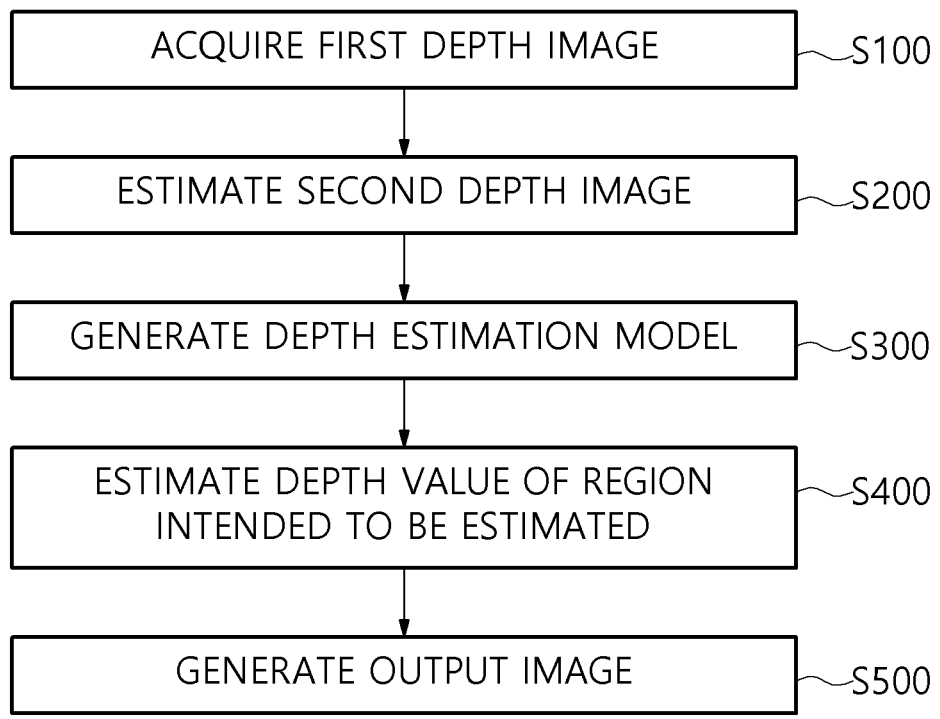
FIG. 1 is a flowchart illustrating a method for estimating a depth of an image according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

Recently, a lot of studies for estimating a depth using two camera images have been conducted. When a point (x, y) for one pixel in the left camera image matches a point (x-d, y) in the right camera image, the depth may be calculated to be f*b/d. Here, d indicates the phase difference between the two points, and depth estimation may be the process of calculating the phase difference.

Such a depth is a relative difference between specific points in an image and is not a physical value in the real world, but may be used as a physical distance when it is scaled adaptively to the external environment. Research for estimating a depth may be classified into a stereo depth estimation technique, which estimates a depth by inputting left and right camera images, and a monocular depth estimation technique, which estimates a depth using only a single camera image.

As deep-learning technology is greatly developed with various open datasets for autonomous vehicles or robots, research for estimating a depth of an image using a neural network is actively underway.

Although there is a difference between a physical value acquired using a stereo camera and a distance value based on monocular depth, the monocular depth may be made similar to the stereo depth when the monocular depth is intuitively scaled using a certain value.

If monocular depth can be used as physical depth information through the process of finding a specific scaling function capable of reducing the difference between the monocular depth and the stereo depth and applying the same to the monocular depth, the physical recognition range of a stereo camera having a narrow baseline may be extended without data collection for additional learning or a learning process.

That is, if the difference between a distance value acquired using a stereo camera and a monocular inference result can be linearly or nonlinearly modeled within a stable distance range presented by the manufacturer of a small stereo camera and used for correction of the monocular inference result in the range that can be seen by the stereo camera, a distance value usable in a region further than the region provided by the stereo camera specification may be provided without additional learning.

FIG. 1 is a flowchart illustrating a method for estimating a depth of an image according to an embodiment of the present disclosure, and FIGS. 2 to 5 are views for explaining detailed steps of a method for estimating a depth of an image according to an embodiment of the present disclosure. Here, the method for estimating a depth of an image may be performed by a depth estimation apparatus.

Referring to FIG. 1, the depth estimation apparatus according to an embodiment may acquire a first depth image having different first depth values at step S100.

The depth estimation apparatus according to an embodiment may acquire the first depth image from a stereo camera. Here, the first depth image may be a stereo depth image.

Figure 2:
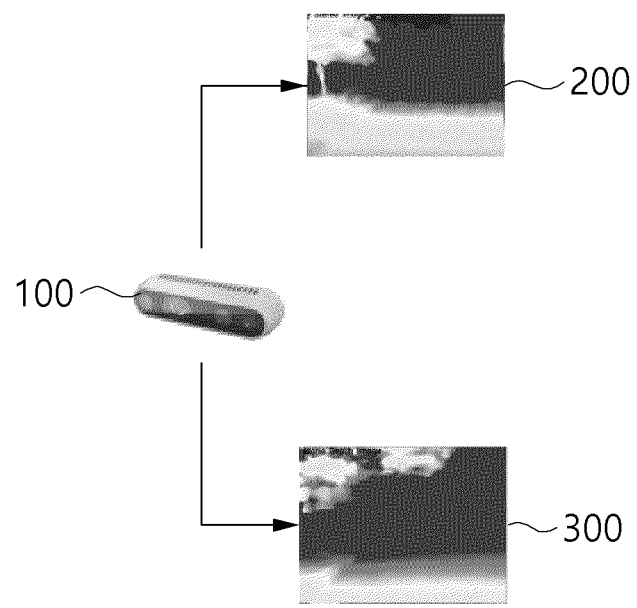
FIGS. 2 to 5 are views for explaining detailed steps of a method for estimating a depth of an image according to an embodiment of the present disclosure.

As illustrated in FIG. 2, a stereo camera 100 is a stereoscopic camera, and is a camera from which two images can be simultaneously acquired. The stereo camera may use a method of capturing the same object using two lenses arranged to be spaced a fixed distance apart from each other. When the images captured in this way are viewed using a stereo viewer, a stereoscopic image can be viewed.

That is, the stereo camera 100 is a capture device for capturing an object using a left camera and a right camera that are arranged to be spaced a fixed distance apart from each other, and the left camera and the right camera may capture a left image and a right image, respectively.

Stereo matching may be a method of finding corresponding points in images input to the left camera and the right camera, thereby calculating a depth.

Accordingly, the first depth image 200 may be acquired by stereo matching of the left and right images in the stereo camera 100.

Referring back to FIG. 1, the depth estimation apparatus according to an embodiment may estimate a second depth image at step S200. Here, the second depth image may be a monocular depth image.

As illustrated in FIG. 2, the depth estimation apparatus according to an embodiment may estimate the second depth image 300 having different second depth values using any one color image, among the left and right images acquired from the stereo camera 100. The depth estimation apparatus according to an embodiment may estimate the second depth image 300 for the color image through a monocular depth network.

Referring back to FIG. 1, the depth estimation apparatus according to an embodiment may generate a depth estimation model based on the depth values of the first depth image 200 and the second depth image 300 at step S300.

Figure 3:
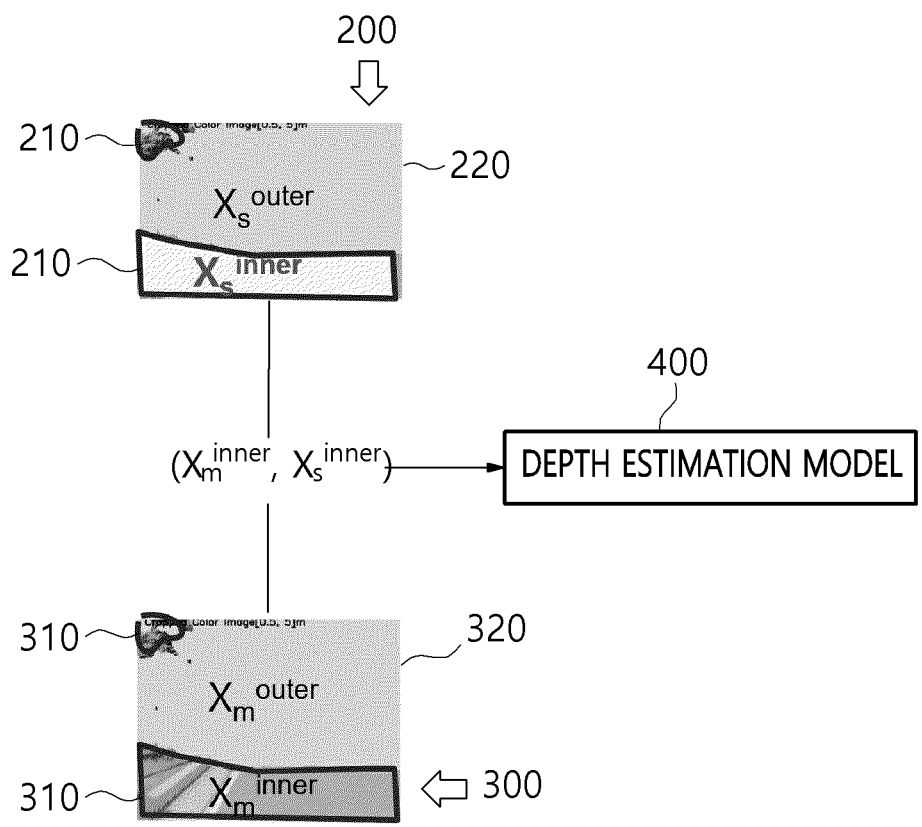

As illustrated in FIG. 3, the first depth image 200 may be divided into a region 210 within a specification distance range presented by the stereo camera and a region 220 out of the specification distance range presented by the stereo camera. Similarly, the second depth image 300 may be divided into a region 310 within the specification distance range presented by the stereo camera and a region 320 out of the specification distance range presented by the stereo camera.

The depth estimation apparatus according to an embodiment may make a pair $X_m^{inner}$, $X_s^{inner}$) by pairing first depth values $X_s^{inner}$ of the region 210 within the specification distance range presented by the stereo camera in the first depth image 200 with second depth values $X_m^{inner}$ of the second depth image 300 corresponding to the locations of the first depth values.

The depth estimation apparatus according to an embodiment generates a depth estimation model using the depth values of pixels of a region within the specification range of a stereo camera, thereby predicting a reliable result.

Referring back to FIG. 1, the depth estimation apparatus according to an embodiment may estimate the depth value of a region intended to be estimated using the depth estimation model at step S400.

Here, the region intended to be estimated may be a region out of the specification range of the stereo camera. The depth estimation apparatus according to an embodiment may extend the physical recognition range of the stereo camera without increasing the baseline of the stereo camera.

Figure 4:
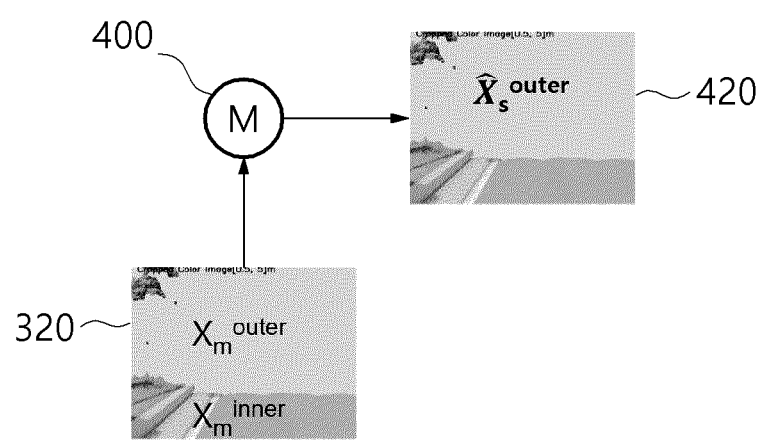

As illustrated in FIG. 4, the depth estimation apparatus according to an embodiment may use third depth values $X_m^{outer}$ in the region 320 out of the specification range of the stereo camera in the image, which is the region intended to be estimated in the second depth image 300, as the input to the depth estimation model 400.

The depth estimation model 400 may estimate fourth depth values $\hat{X}_s^{outer}$ of the first depth image corresponding to the third depth values $X_m^{outer}$.

That is, the depth estimation apparatus according to an embodiment may estimate the depth value of the region that cannot be recognized by the stereo camera using the depth estimation model.

Referring back to FIG. 1, the depth estimation apparatus according to an embodiment may generate an output image using the estimated depths at step S500.

Figure 5:
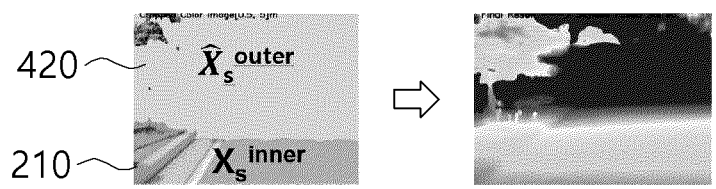

As illustrated in FIG. 5, the output image may be generated by combining the images 210 and 420 formed with the first depth values $X_s^{inner}$ of the first depth image, which fall within the specification range of the stereo camera, and the fourth depth values $\hat{X}_s^{outer}$ estimated using the depth estimation model.

Alternatively, the output image may be generated by inputting all of the depth values of the second depth image to the depth estimation model.

With regard to a small stereo camera for practicing the present disclosure, the relationship between a physical depth value and an estimated monocular depth value within the distance specified in the specification presented by the manufacture of the stereo camera can be linearly or nonlinearly modeled. Therefore, the scope of the model is not limited to a linear relationship model in the embodiment.

In the process of extracting sampling data for modeling a depth estimation model in an embodiment, using all data may cause a large number of outliers, which results in data inaccuracy. In order to reduce such data inaccuracy resulting from the outliers, the distance (depth) for extracting samples are divided into sections, and the mean of the first depth values corresponding to each section and the mean of the second depth values corresponding thereto are paired with each other, whereby modeling may be performed. Accordingly, the inflow of noise resulting from outliers may be minimized.

A small robot has characteristics in which the surrounding environment does not rapidly change because it moves at low speeds compared to the image-processing rate. When the depth estimation technique according to the present disclosure is applied to such a small robot, reusing a previously generated model may be more effective than newly finding a depth estimation model for each image.

To this end, a processing procedure for verifying the effectiveness of the first depth estimation model is proposed in the embodiment.

Figure 6:
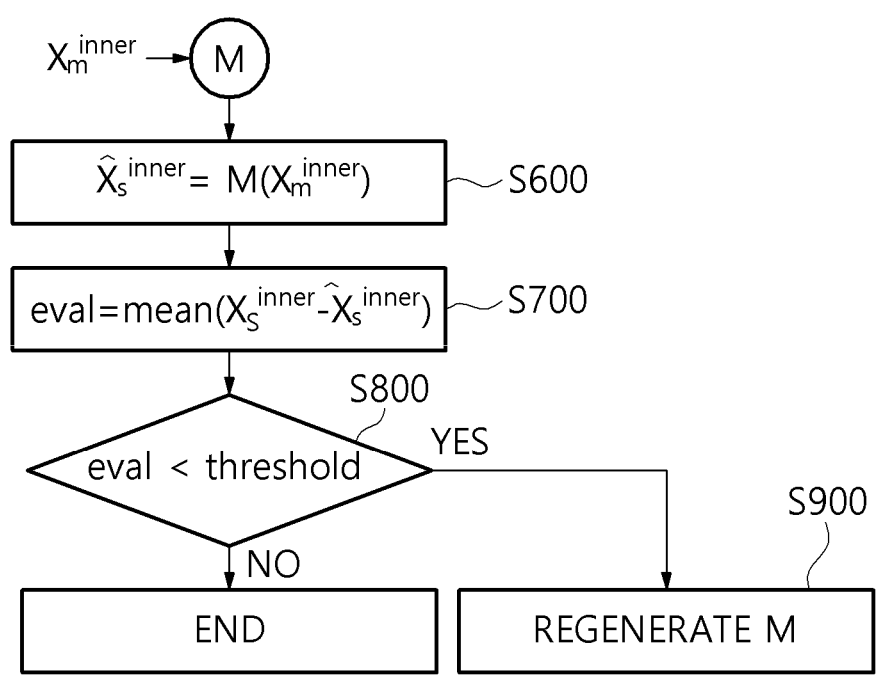
FIG. 6 is a flowchart illustrating a processing procedure for verifying the effectiveness of a depth estimation model according to an embodiment of the present disclosure.

FIG. 6 is a flowchart illustrating a processing procedure for verifying the effectiveness of a depth estimation model according to an embodiment of the present disclosure.

As illustrated in FIG. 6, the depth estimation apparatus according to an embodiment may output fifth depth values $\hat{X}_s^{inner}$ of the first depth image that are output when the second depth values $X_m^{inner}$ are input to the depth estimation model at step S600.

The depth estimation apparatus according to an embodiment may compare whether the fifth depth values $\hat{X}_s^{inner}$ are similar to the first depth values $X_s^{inner}$ of the first depth image matching the fifth depth values $\hat{X}_s^{inner}$ at step S700.

The depth estimation apparatus according to an embodiment may check whether the comparison value between the fifth depth values and the first depth values is less than a preset threshold at step S800. Here, the comparison value may include the difference between the fifth depth values and the first depth values or at least one of a cumulative mean acquired by accumulating the differences between the fifth depth values and the first depth values, a cumulative Root Mean Squared Error (RMSE), a cumulative mean log error, a cumulative squared relative difference, or a cumulative RMSE log, or a combination thereof. Here, the method of comparing the fifth depth values and the first depth values is not limited to the difference, the cumulative mean, the cumulative RMSE, the cumulative mean log error, the cumulative squared relative difference, or the cumulative RMSE log, and any of various calculation methods may be used.

The depth estimation apparatus according to an embodiment may terminate the procedure when the difference is less than the preset threshold, but may regenerate a depth estimation model at step S900 when the difference is equal to or greater than the preset threshold.

The depth estimation apparatus according to an embodiment may be implemented in a computer system including a computer-readable recording medium.

Figure 7:
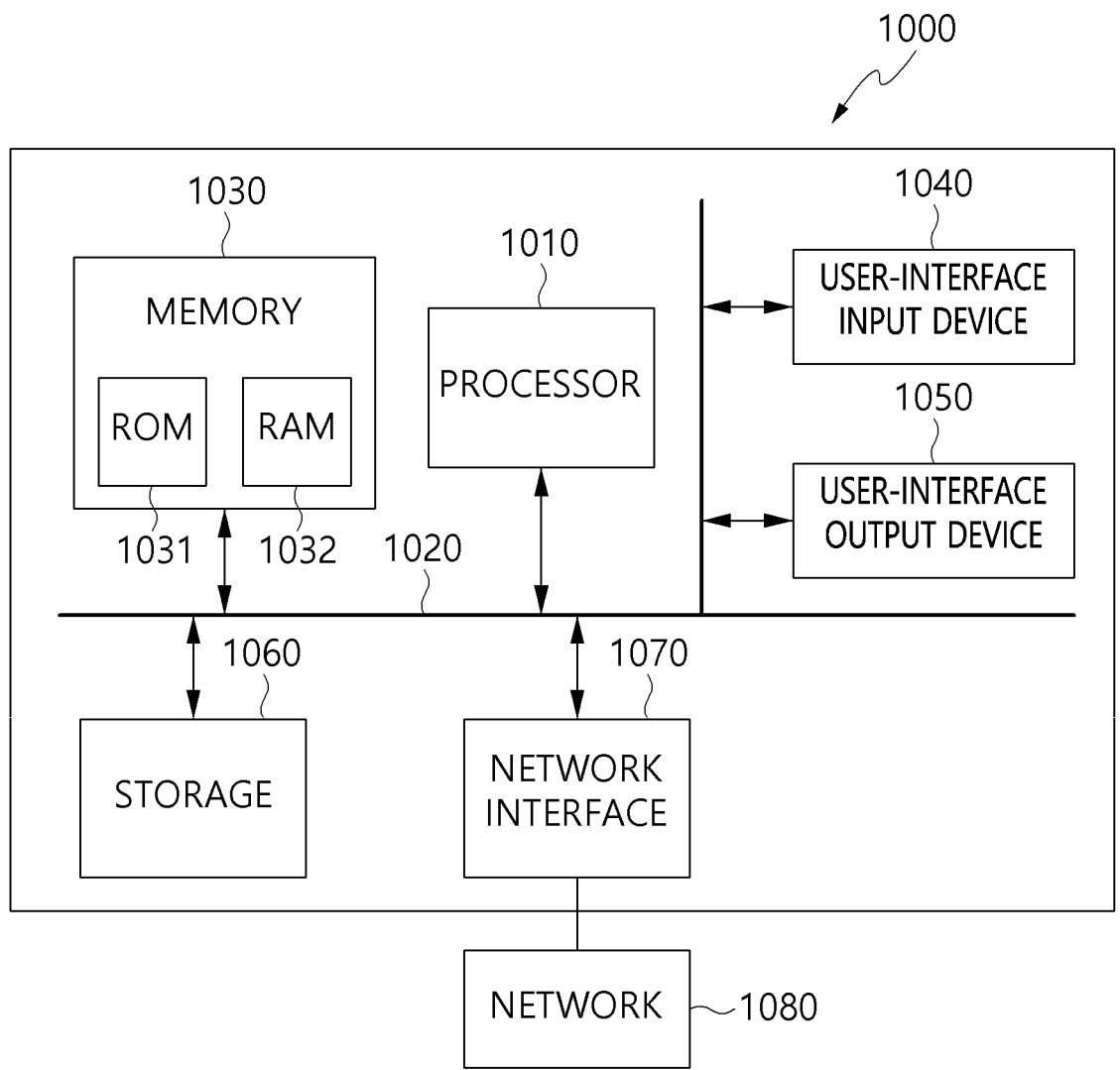
FIG. 7 is a block diagram illustrating the configuration of a computer system according to an embodiment of the present disclosure.

FIG. 7 is a block diagram illustrating the configuration of a computer system according to an embodiment of the present disclosure.

Referring to FIG. 7, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the depth estimation apparatus.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a depth estimation method according to an embodiment. Specifically, the memory may store multiple applications running in the depth estimation apparatus and data and instructions for operation of the depth estimation apparatus.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program therein may contain instructions for making a processor perform a method including an operation for acquiring a first depth image based on left and right images collected from a stereo camera, an operation for estimating a second depth image based on any one of the left and right images, an operation for generating a depth estimation model based on first depth values within a depth range recognized by the stereo camera in the first depth image and on second depth values of the second depth image matching the first depth values, and an operation for inputting third depth values of a region intended to be estimated in the second depth image to the depth estimation model, thereby estimating fourth depth values of the first depth image matching the third depth values.

According to an embodiment, a computer program stored in the computer-readable recording medium may include instructions for making a processor perform a method including an operation for acquiring a first depth image based on left and right images collected from a stereo camera, an operation for estimating a second depth image based on any one of the left and right images, an operation for generating a depth estimation model based on first depth values within a depth range recognized by the stereo camera in the first depth image and on second depth values of the second depth image matching the first depth values, and an operation for inputting third depth values of a region intended to be estimated in the second depth image to the depth estimation model, thereby estimating fourth depth values of the first depth image matching the third depth values.

According to the present disclosure, a depth value for a region outside of the specification range of a stereo camera may be effectively estimated using a depth estimation model.

Also, the present disclosure generates a depth estimation model based on data within the specification range of a stereo camera, thereby improving the accuracy of the depth estimation model.

Also, the present disclosure may improve the performance of recognition of the driving environment information of a small robot without an expensive sensor.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device.

Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for estimating a depth of an image, comprising:
acquiring a first depth image based on left and right images collected from a stereo camera;
estimating a second depth image based on any one of the left and right images;
generating a depth estimation model based on first depth values within a depth range recognized by the stereo camera in the first depth image and on second depth values of the second depth image matching the first depth values; and
inputting third depth values of a region intended to be estimated in the second depth image to the depth estimation model, thereby estimating fourth depth values of the first depth image matching the third depth values,
wherein the depth estimation model is generated by pairing the first depth values with the second depth values matching the first depth values.

2. The method of claim 1, further comprising:
generating an output image using the fourth depth values and the first depth values.

3. The method of claim 1, wherein the third depth values of the region intended to be estimated in the second depth image include all depth values of the second depth image.

4. The method of claim 1, wherein the depth estimation model is generated by dividing the depth range recognized by the stereo camera into sections and pairing means of the first depth values with means of the second depth values for the respective sections.

5. The method of claim 1, wherein:
fifth depth values of the first depth image, which are output when inputting the second depth values to the depth estimation model, are compared with the first depth values of the first depth image matching the fifth depth values, and
the depth estimation model is regenerated when a comparison value is equal to or greater than a preset threshold.

6. The method of claim 5, wherein the comparison value is generated by calculating at least one of a cumulative mean acquired by accumulating differences between the fifth depth values and the first depth values, a cumulative Root Mean Squared Error (RMSE), a cumulative mean log error, a cumulative squared relative difference, or a cumulative RMSE log, or a combination thereof.

7. A method for estimating a depth of an image, comprising:
acquiring a first depth image based on left and right images collected from a stereo camera;
estimating a second depth image based on any one of the left and right images;
generating a depth estimation model based on first depth values within a depth range recognized by the stereo camera in the first depth image and on second depth values of the second depth image matching the first depth values; and
inputting third depth values of a region intended to be estimated in the second depth image to the depth estimation model, thereby estimating fourth depth values of the first depth image matching the third depth values,
wherein the third depth values of the region intended to be estimated in the second depth image are depth values out of the depth range recognized by the stereo camera.

8. An apparatus for estimating a depth of an image, comprising:
memory in which a control program for estimating a depth of an image is stored; and
a processor for executing the control program stored in the memory,
wherein the processor acquires a first depth image based on left and right images collected from a stereo camera, estimates a second depth image based on any one of the left and right images, generates a depth estimation model based on first depth values within a depth range recognized by the stereo camera in the first depth image and on second depth values of the second depth image matching the first depth values, and inputs third depth values of a region intended to be estimated in the second depth image to the depth estimation model, thereby estimating fourth depth values of the first depth image matching the third depth values,
wherein the processor generates the depth estimation model by pairing the first depth values with the second depth values matching the first depth values.

9. The apparatus of claim 8, wherein the processor generates an output image using the fourth depth values and the first depth values.

10. The apparatus of claim 8, wherein the third depth values of the region intended to be estimated in the second depth image are depth values out of the depth range recognized by the stereo camera.

11. The apparatus of claim 8, wherein the third depth values of the region intended to be estimated in the second depth image include all depth values of the second depth image.

12. The apparatus of claim 8, wherein the processor divides the depth range recognized by the stereo camera into sections and pairs means of the first depth values with means of the second depth values for the respective sections, thereby generating the depth estimation model.

13. The apparatus of claim 8, wherein the processor compares fifth depth values of the first depth image, which are output when inputting the second depth values to the depth estimation model, with the first depth values of the first depth image matching the fifth depth values, and regenerates the depth estimation model when a comparison value is equal to or greater than a preset threshold.

14. The apparatus of claim 13, wherein the processor generates the comparison value by calculating at least one of a cumulative mean acquired by accumulating differences between the fifth depth values and the first depth values, a cumulative Root Mean Squared Error (RMSE), a cumulative mean log error, a cumulative squared relative difference, or a cumulative RMSE log, or a combination thereof.

* * * * *